United States Patent
Crites et al.

[19]

[11] Patent Number: 6,097,380
[45] Date of Patent: Aug. 1, 2000

[54] CONTINUOUS MEDIA STREAM CONTROL

[75] Inventors: Brian D. Crites, Redmond; Edward J. Praitis, Woodinville, both of Wash.

[73] Assignee: Microsoft Corporation, Redmond, Wash.

[21] Appl. No.: 08/669,983

[22] Filed: Jun. 24, 1996

[51] Int. Cl.[7] .................................................. G06F 3/100
[52] U.S. Cl. ............................................................ 345/302
[58] Field of Search ................................. 345/302, 326, 345/333, 334, 335

[56] References Cited

PUBLICATIONS

Microsoft® Media Player Version 4.0 (Trademark of Microsoft Corp.) Screen Display pp. 1–10, 1981–1996.

*Primary Examiner*—Phu K. Nguyen
*Assistant Examiner*—Cliff N. Vo
*Attorney, Agent, or Firm*—Lee & Hayes, PLLC

[57] ABSTRACT

A network system includes one or more network servers and a plurality of available media streams. The media streams are formatted differently. Some are file-based streams, supplied by the network servers. Others are supplied by local tuners from digital and/or analog signal broadcasts. A network client executes an application program that is to control rendering of the media streams. Each media stream is represented by a programming object. Each programming object has identical interface functions that can be invoked by the application program to control playback of the different media streams even though such media streams are of different media types.

32 Claims, 6 Drawing Sheets

CONTINUOUS MEDIA STREAM CONTROL

TECHNICAL FIELD

This invention relates to computer and network systems that render continuous media information such as audio and video information from sources such as network servers and analog tuners.

BACKGROUND OF THE INVENTION

There was a time when information presented by a computer was limited to numbers and/or text. With modern personal computers, however, a wide variety of information can be presented, including graphics, audio, and video.

The number of information sources has also multiplied. Multimedia information is now available from local digital storage such as CD-ROMs, from remote providers and online services, and even from local analog sources such as television and radio receivers.

While such variety allows application programs to provide much richer content, it also creates a degree of complexity for programmers. Such complexity is a result primarily of the different ways in which application programs must interact with different computer and network elements to render information of various kinds from different sources.

It is possible to relieve application programs of some of the details of information rendering by providing APIs (application programming interfaces) that take care of such details. Even with such APIs, however, application programs must be aware of the types of information they are rendering and must be able to determine the correct APIs for rendering such information. This approach makes it difficult to add new media types to a system. In order to take advantage of a new media type, each application program has to be rewritten so that it is aware of the proper APIs to use for rendering the media type.

SUMMARY OF THE INVENTION

The invention described below enables application programs to render continuous media streams of different types and from different sources without being aware of the details of the media streams such as format or location or how it is rendered. Each media stream is represented as an object with a plurality of interfaces. The interfaces have functions or methods for adjusting the volume of a media stream, for setting display parameters for video streams, and for performing other functions with regard to the rendering of media streams.

In the embodiment described below, an application program learns of a media stream by receiving a pointer to a media-specific object representing the media stream. The application program passes this pointer to an object creation function that implements a general-media programming object, resulting in a general-media object that has a similar or identical set of interfaces regardless of the type of media stream the general-media object represents. Using this scheme, the application program is never required to be aware of the details of the media stream. Rather, the general-media programming object performs any lower-level functions necessary to control the rendering of the media stream.

DETAILED DESCRIPTION OF THE PREFERRED EMBODIMENT

Figure 1:
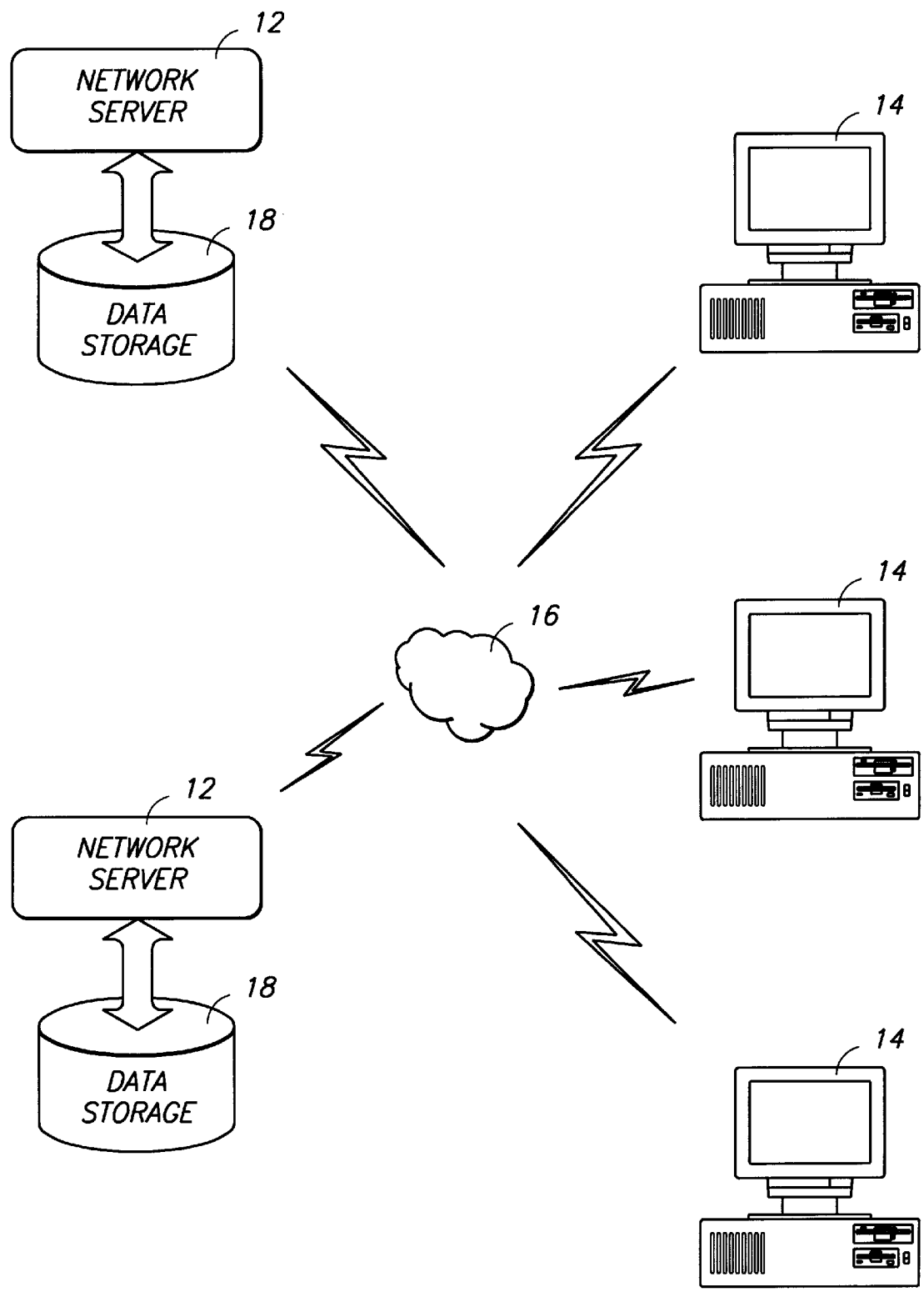
FIG. 1 shows a computer network system in accordance with one embodiment of the invention.

FIG. 1 shows a computer network system in accordance with one embodiment of the invention. The system includes one or more network servers 12 and a plurality of network client computers 14. The client computers preferably communicate with the servers through local-area or wide-area networks 16, and/or are connected for communication with servers 12 by on-demand or dial-up connections such as conventional modem connections. For example, a particular client computer 14 might be connected to the Internet through a modem connection to a local Internet service provider. Servers 12 in this case would typically have dedicated, high-speed connections to the Internet. As another example, a client computer 14 might be connected to a server 12—such as an online service provider like Compuserve or the Microsoft Network—by a direct, dial-up, modem connection.

The network servers 12 have access to mass storage devices 18 on which are stored a plurality of continuous media data streams. In this case, the continuous media streams consist of sequences of digital data that are intended to be supplied serially to client computers and rendered by the client computers in a form that is useful to users of the client computers. For example, a continuous media stream might consist of a sequence of audio samples which are to be converted to analog format by the client computer and rendered as audible sound. As another example, a continuous media stream might consist of a sequence of video frames that are to be rendered sequentially by the client machine. In many cases, the data streams will be compressed.

These continuous media data streams are typically stored as files on mass storage devices 18, and are referenced by conventional file names. A client can specify a particular media stream by indicating its file name in combination with a unique name or ID that has been assigned to the server having access to the mass storage device on which the file resides.

Figure 2:
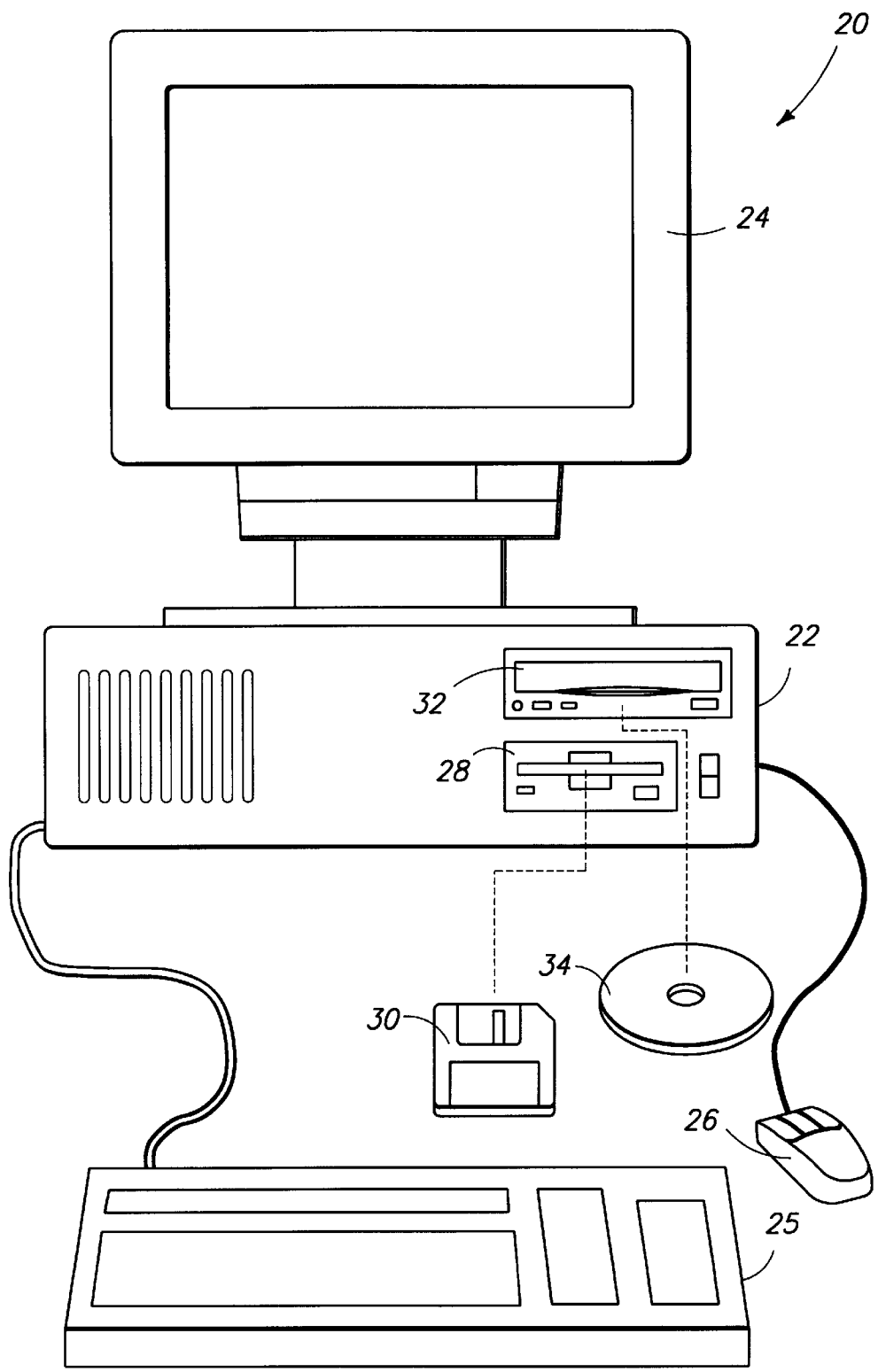
FIG. 2 shows a client computer in accordance with the invention.

FIG. 2 shows a client computer 20 in the form of a conventional desktop IBM-compatible computer. Client computer 20 has a central processing unit (CPU) 22, a display monitor 24, a keyboard 25, and a mouse 26. The computer 20 also has a floppy disk drive 28 for interfacing with a compatible floppy memory diskette 30 (e.g., 3.5" form factor), and an optical disk drive 32 for interfacing with a compatible CD-ROM 34. The computer 20 might also include another input device in addition to, or in lieu of, the keyboard 25 and mouse 26 including such devices as a track ball, stylus, or the like.

Figure 3:
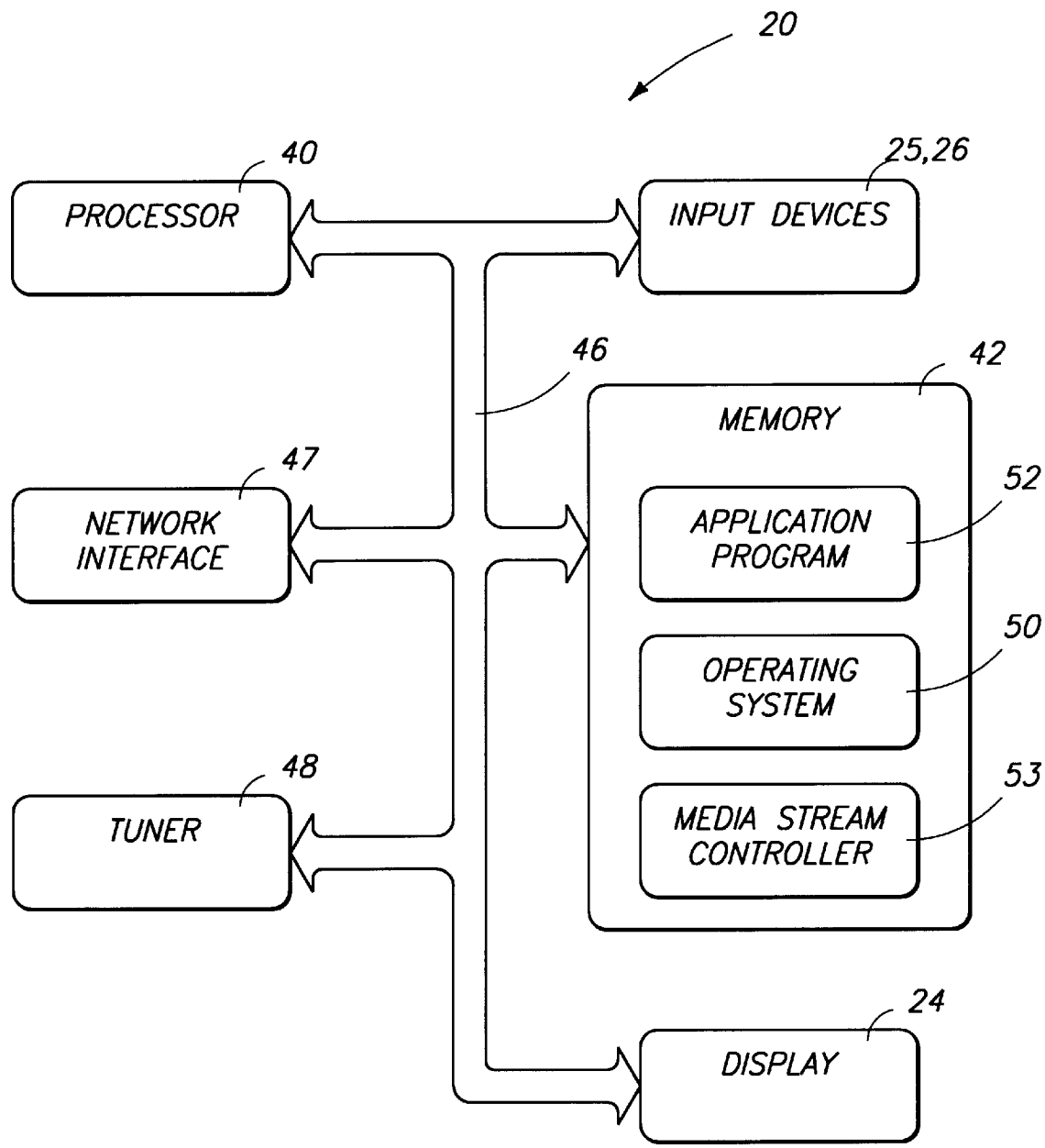
FIG. 3 is a functional block diagram of the computer shown in FIG. 2.

FIG. 3 shows a functional block diagram of the computer 20, revealing components that are not shown in FIG. 2. The computer 20 has a processor 40 and computer-readable storage media 42 including volatile memory (e.g., RAM) and non-volatile memory. The various components are interconnected by an internal bus 46. Non-volatile memory can be implemented as integrated circuit chips (e.g., ROM, EEPROM), disk drive(s) (e.g., floppy, optical, hard), or a combination of both. The volatile memory will typically comprise electronic DRAM (dynamic random access memory). Display 24 is connected to bus 46 through appropriate hardware interface drivers (not shown). Additionally, input devices 25 and 26 are connected to supply data to bus 46 via appropriate I/O ports, such as serial RS-232 ports.

Computer 20 includes a network interface 47 for connection to a remote network server. As discussed above, the connection to the server can be through a local-area or wide-area network. Network interface 47 therefore comprises a conventional Ethernet network card, a modem, or another device that provides communications with a server.

The computer also includes one or more local analog tuners 48. The tuners are connected to receive analog broadcast signals from one or more sources. A tuner might be a radio tuner for receiving radio broadcasts or paging messages. Alternatively, such a tuner might be a television receiver for receiving television broadcasts that include both video and sound. An example of such a tuner is manufactured by Zenith Electronics Corp. of Glenview, Ill., as model number #ST5612.

The analog data received from the tuner is considered a continuous media stream for purposes of this description.

Computer 20 runs an operating system 50 which supports multiple applications. Operating system 50 is stored in memory 42 and executed on processor 40. The operating system is preferably a multitasking operating system which allows simultaneous execution of multiple applications, although aspects of this invention may be implemented using a single-tasking operating system. The operating system preferably employs a graphical user interface windowing environment which presents the applications or documents in specially delineated areas of the display screen called "windows." Each window has its own adjustable boundaries which enable the user to enlarge or shrink the application or document relative to the display screen. Each window can act independently, optionally including its own menu, toolbar, pointers, and other controls, as if it were a virtual display device. One preferred operating system is the Windows® operating system sold by Microsoft Corporation, such as Windows® 95 or Windows NT™ or other derivative versions of Windows®. However, other operating systems which provide windowing environments may be employed, such as the Macintosh Finder from Apple Corporation and the OS/2 Presentation Manager from IBM.

An application program 52 is stored in memory 42. When activated, the application program 52 runs under operating system 50 while executing on processor 40. The application program 52 can be loaded into electronic memory from the floppy diskette 30 or CD-ROM 34 or, alternatively, downloaded from network 16 via network interface 47.

In addition, a media stream controller 53 is stored in memory 42 and executed by processor 40. Media stream controller 53 allows application program 52 to create programming objects representing the different media streams. Because of this, the application program does not need to be aware of the specifics of the media streams. In fact, the application program controls the rendering of each media stream using the same procedures regardless of the format or source of the media stream.

The programming objects created by media stream controller 53 have common interface functions that can be invoked by the application program to control playback of different media streams even though such media streams are of different media types. For example, each programming object has a volume control interface having identical methods or functions that can be invoked by the application program to determine and set the rendered volume level of a particular media stream—whether the media stream is a digital audio stream or an analog television broadcast.

The invention is described within the context of a familiar desktop computer that typically includes an Intel-based or Intel-compatible microprocessor, with four to sixteen megabytes of RAM. Such a computer is capable of running a multitasking operating system with a windowing environment. However, aspects of this invention might also be employed in other forms of computing devices, such as laptop computers, hand-held computers, portable personal information managers (PIMs), and the like. In these devices, the application program may be configured to run on a single-tasking operating system which does not support a windowing environment.

In addition, the invention will be useful in non-traditional network environments other than the wide-area network environment shown. For example, the invention will be useful in the interactive TV environment, where the server will consist of a cable headend and the client will consist of a set-top box or other device performing a similar function. In many proposed interactive TV systems, the headend will be capable of supplying media streams in a variety of different formats, such as file-based digital formats and broadcast digital and analog formats. Some media streams will be supplied on demand to individual clients, while others will be broadcast on a pre-determined schedule. In this environment, the client will include both a digital network interface and an analog tuner for receiving television or other audio/visual broadcasts.

The configuration of FIGS. 1–3 includes several media sources, which are capable of supplying media streams in a variety of different formats. For example, the local non-volatile storage of computer 20 is a potential source of media streams. Audio and/or video streams are available from local hard disks, floppy disks, and CD-ROMs. Similar streams might be available from Internet sources or other network sources such as a server 12. Tuners 48 also supply media streams. In some cases, the tuner itself will render the media streams, without participation by processor 40 of computer 20. In other cases, a tuner will supply a digital data stream for rendering by processor 40. In many cases, processor 40 or application program 52 can control the channel or frequency of the tuner, to select a particular broadcast signal.

Typical file-based digital media formats include ".wav" audio files and ".avi" video files commonly used in the Windows® operating environment. "MPEG" is another file or media stream format for video information. Available media formats also include analog formats including analog radio and TV broadcast formats.

In this document, the "type" of a media stream includes both its format and its source. In the prior art, even media streams having the same data format must often be treated differently by an application program if they originate from different sources. For example, the steps for obtaining a ".wav" media stream from a local source might be quite different from obtaining an identical media stream from a remote network server.

As mentioned above, media stream controller 53 allows application program 52 to create and use programming objects to represent different media streams. Such objects are implemented in the Microsoft Windows® programming environment using features of Object Linking and Embedding (OLE), also referred to as ActiveX technology. OLE is based on a protocol referred to as the Component Object Model (COM). COM specifies how objects interact with each other using interfaces. OLE and COM have been well documented and will not be explained in detail here. For more information regarding OLE and COM, refer to "OLE 2 Programmer's Reference" and "Inside OLE 2, Second Edition," by Kraig Brockschmidt, both published by Microsoft Press of Redmond, Wash., and both of which are hereby incorporated by reference.

Figure 4:
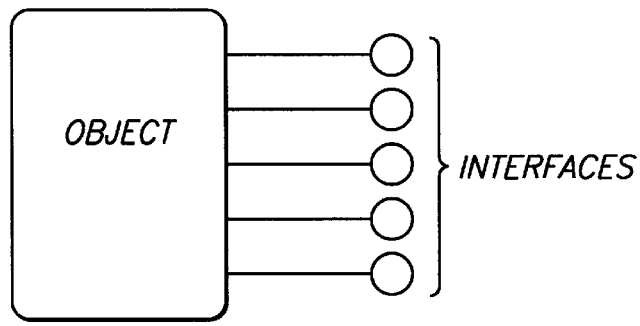
FIG. 4 shows a conventional representation of a programming object and its interfaces.

Objects and their interfaces are conventionally illustrated as shown in FIG. 4. A circle is used to represent each interface.

The services or functions of an object can be used by both in-process clients and by out-of-process clients. In addition, an object interface can be used by a client executing on a different computer. The COM protocol covers all of these situations. Calling a remote interface (one that is in a different address space than the calling process) requires the use of "stubs" and "proxies," and involves topics such as "marshalling" and "unmarshalling" of procedure parameters. These mechanisms are well understood and are documented in the books mentioned above. Also refer to "X/Open DCE: Remote Procedure Call," published by X/Open Company Ltd., U.K. In addition, the Microsoft Development Library CD (April 1996), available from Microsoft® of Redmond, Wash., contains a Specification entitled "Component Object Model Specification 0.9" that discusses distributed COM programming. Both of these references are incorporated by reference.

Figure 5:
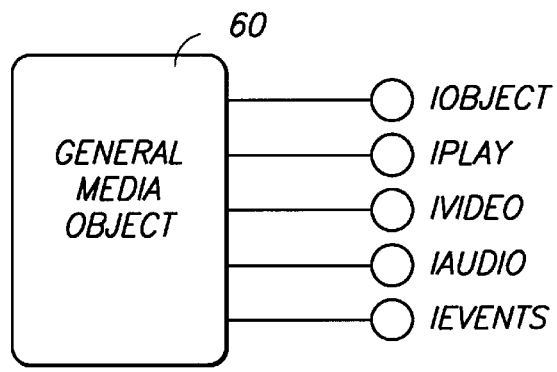
FIG. 5 shows a general-media programming object and preferred interfaces.

FIG. 5 shows a general-media programming object 60 implemented by media stream controller 53. Such an object is created for every desired media stream and/or source, including both analog and digital sources. It includes the following interfaces, which are common to all general-media programming objects; regardless of whether they represent analog or digital media services, and regardless of whether they represent file-based sources or tuner-type sources:

IObject. This interface has functions for initializing, activating, and deactivating the media object.

IPlay. This interface has functions for controlling playback of the media object, including functions for starting, stopping, and pausing rendering of media streams. Additionally, for media sources that have the capability, this interface also supports fast-forward and rewind operations.

IVideo. The video control interface has functions for determining and controlling the size, position, and visibility of video output generated by a video media object. This interface is not available for media streams that do not include video.

IAudio. This interface, also referred to as the volume control interface, has functions for determining and controlling the volume levels and audio channel of audio produced by the media object.

IEvents. This interface allows an application program to receive and respond to events generated by media objects.

These interfaces, and the functions implemented by the interfaces, are the same for each instance of a general-media programming object 60, regardless of the type of media source or media stream represented by the object. For instance, a general-media programming object representing a remote network source has the same interfaces and functions as a general-media programming object representing an analog broadcast source. To control any aspect of the rendering from a particular media source, an application program invokes the proper interface function of the object representing the media source. The application program follows the same procedure regardless of the type of the media source.

Underlying each general-media programming object is a media-specific object that may be created under the direction of application program 52, by some other process in computer 20, or by a remote server. The media-specific object has interfaces that allow the general-media object to locate the corresponding media source. For instance, for a remote server source, the media-specific object allows the general-media object to determine the server ID and filename of the media stream that is to be rendered. For a local tuner source, the media-specific object indicates the channel number or frequency of the subject media stream.

Figure 6:
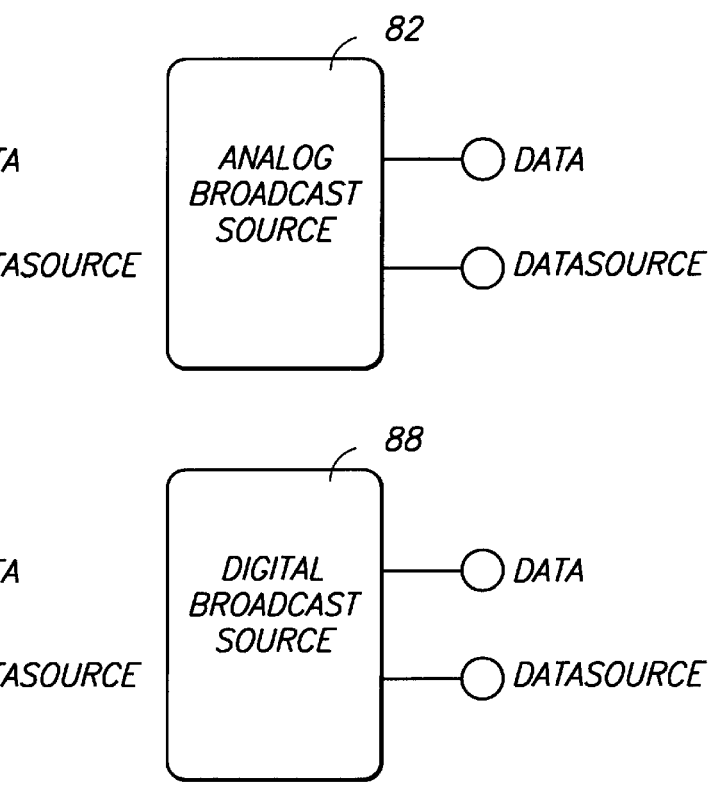
FIG. 6 shows examples of media-specific programming objects.

FIG. 6 shows exemplary media-specific objects. Each of these objects has a "Data" interface that returns an identifier that allows the object to be uniquely identified, and a DataSource interface with the functions mentioned above that can be invoked to reveal source information. Object 70 corresponds to a server file source. Object 76 corresponds to an AVI (audio-video interleaved) file source. An AVI file uses an interleaved format in which video and audio that are to be played at the same time are located at the same place in the file.

Object 82 corresponds to an analog broadcast source such as an RF (radio frequency) tuner. Object 88 corresponds to a digital broadcast source such as might be used in some foreign countries like Japan For the first two types of media-specific objects (server file source and AVI source), the DataSource interface has functions that return the server ID and filename for a particular data file. For the second two types of media-specific objects (analog and digital broadcast sources), the DataSource interface has functions that simply return a frequency or channel number for a broadcast media stream.

Figure 7:
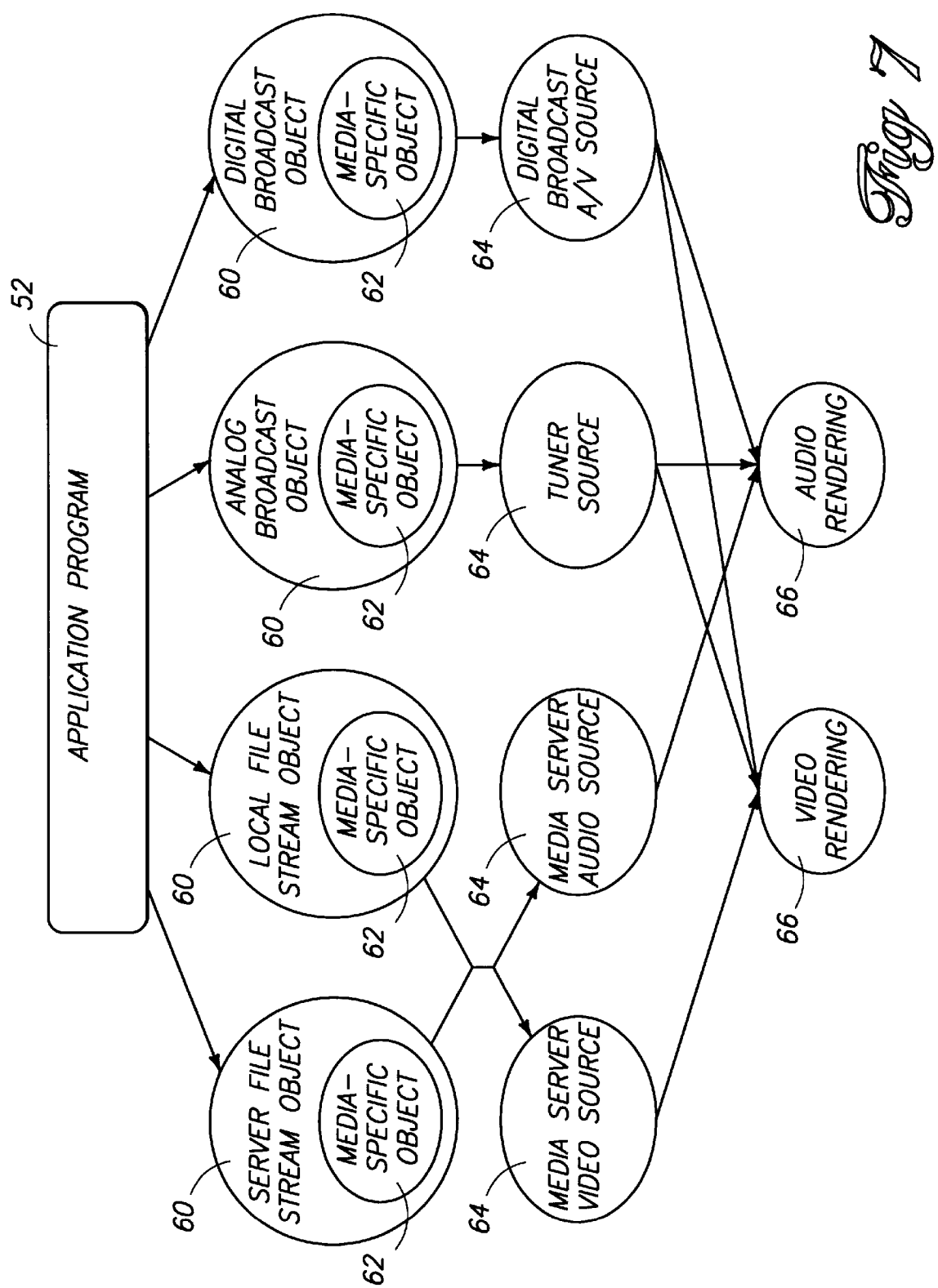
FIG. 7 shows the interactions of various components in accordance with the invention.

FIG. 7 shows how the various objects and components interact with each other. Application program 52 is shown at the top of the diagram. It interacts with one or more general-media objects 60, which in turn interact with media-specific objects 62. Objects 60 interact with the various media sources 64, which pass data or signals to appropriate rendering devices 66. FIG. 7 illustrates rendering audio and video from a remote network server, from a local file source, from an analog tuner source, and from a digitally-broadcast audio/visual source.

Figure 8:
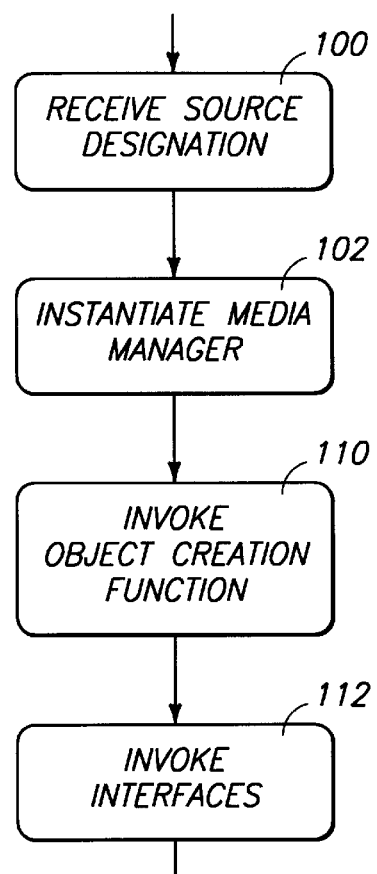
FIG. 8 shows preferred steps in accordance with the invention.

In the present embodiment, an application program follows the procedure of FIG. 8 to set up a general-media programming object. First, the application program performs a step 100 of receiving a source designation that specifies a media stream. The source designation indicates a filename, a server ID and filename, a channel number, or a frequency, depending on the type of media source from which the media stream will be supplied. In this embodiment of the invention, a source designation is literally a reference or pointer to an interface of a media-specific object. The media-specific object, which may be located locally or remotely (using OLE and COM), has one or more functions that can be invoked to reveal the source information (filename, server ID, channel number, frequency, etc.).

It should be noted that the application program itself will often not be concerned with the details of the media-specific objects. Rather, the application program will simply receive source designations in the form of references or pointers to media-specific objects. In some cases, the application program may be responsible for creating a media-specific object. In the preferred embodiment, APIs are provided for this purpose, for different types of media formats and sources. The application program can call such an API while providing required information about a desired media stream, and the API will return a pointer to a media-specific object representing the media stream.

Figure 9:
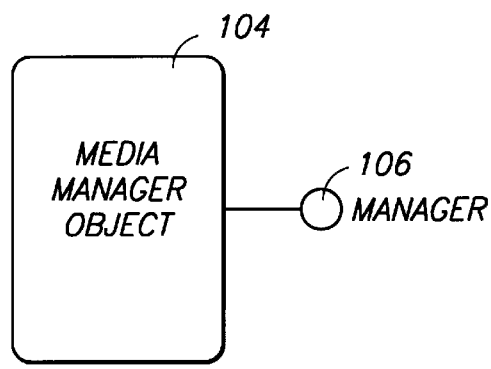
FIG. 9 shows a media manager object in accordance with the invention.

A step 102, performed by an application program, comprises instantiating a media manager object. An exemplary media manager object 104 is shown in FIG. 9. In includes a "Manager" interface 106. The Manager interface is the central mechanism for accessing any type of media object. General-media objects are created using this interface.

A step 110 comprises passing the received source designation to an object creation function. The object creation function is implemented as a method of the Manager interface 106 of media manager object 104. The object creation function accepts a pointer to a media-specific object, and utilizes methods of that object to determine the source of a desired continuous media stream. Based on the source designation, the object creation function creates a general-media object such as shown in FIG. 5, representing a media source. The same object creation function is invoked by the application program regardless of the type of media source represented by any particular media-specific object. Regardless of the media type, a pointer to the media-specific object is passed to the object creation function, and the object creation function creates a general-media programming object having interfaces as shown in FIG. 5 for controlling various aspects of multimedia playback. The general-media programming object is responsible for dealing with the underlying specifics of media sources and rendering hardware, or it can utilize lower-level software components for handling these responsibilities. The application program simply receives a pointer to the general-media programming object from the object creation function.

Step 112 comprises invoking the interfaces of the general-media programming objects to control media rendering from the media sources represented by the programming objects. At this point, controlling these objects is totally independent of the media type being manipulated. Changing the volume of a file-based media stream is no different than adjusting the volume of an analog broadcast, even though different hardware may be manipulated at a lower level.

As a specific example, suppose that an application program will oversee rendering of two different media streams—one from a server- and file-based digital media source and another from a local analog media source such as a tuner. In this case, the application would first either create or receive media-specific objects representing the two media streams—one for the digital data stream and one for the analog broadcast stream. It would then pass pointers to these objects to a general-media object creation function. The object creation function would then create a general-media programming object for each of the two media streams. The general-media programming objects would have identical interfaces, and the application program would invoke them as necessary to determine or set parameters relating to rendering of the media streams.

Although the invention has been described primarily in terms of its computer hardware and methodology, the invention also includes computer readable storage media, such as electronic memory and non-volatile optical- or magnetic-based removable mass storage components, containing instructions for carrying out the steps described above.

Furthermore, it is to be understood that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. In a computer system that includes a plurality of media sources of different types, a method comprising the following steps:

creating programming objects representing the respective media sources, the programming objects having common object interfaces regardless of the types of media sources represented by the respective programming objects;

invoking the interfaces of the programming objects to control media rendering from the media sources represented by the programming objects.

2. A method as recited in claim 1, wherein the common object interfaces include:

a play interface for starting and pausing rendering of media streams from the media sources;

a volume control interface for setting volume levels of media streams from the media sources.

3. A method as recited in claim 1, wherein the common object interfaces include:

a play control interface for starting and pausing rendering of media streams from the media sources;

a volume control interface for setting volume levels of media streams from the media sources;

a video control interface for setting position and size parameters of video media streams from the media sources.

4. A method as recited in claim 1, wherein the step of creating a programming object comprises:

creating a media-specific programming object representing a specific media source;

invoking a general-media object creation function with reference to the media-specific programming object, the general-media object creation function creating a general-media programming object representing the specific media source regardless of the type of the media source, the general-media programming object having the common object interfaces.

5. A method as recited in claim 1, wherein the step of creating programming objects comprises:

creating programming objects representing digital data streams;

creating programming objects representing analog broadcasts;

the programming objects having common object interfaces regardless of whether they represent digital data streams or analog broadcasts.

6. In a computer network having a plurality of media streams available from one or more network servers, a method of playing the media streams at a network client, the method comprising:

receiving a source designation from one of the network servers, the source designation specifying a media stream;

creating a programming object representing the media source based on the source designation, the programming object having common interfaces regardless of the type of media stream represented by the programming object.

7. A method as recited in claim 6, wherein the programming object comprises:
   a play interface for starting and pausing rendering of media streams from the network servers;
   a volume control interface for setting volume levels of media streams being rendered from the network servers.

8. A method as recited in claim 6, wherein the programming object comprises:
   a play interface for starting and pausing rendering of media streams from the network servers and for starting and pausing rendering of media streams from analog sources;
   a volume control interface for setting volume levels of media streams from the network servers and for setting volume levels from analog sources.

9. A method as recited in claim 6, wherein the programming object comprises:
   a play interface for starting and pausing rendering of media streams from the network servers and for starting and pausing rendering of media streams from analog sources;
   a volume control interface for setting volume levels of media streams from the network servers and for setting volume levels from analog sources;
   a video control interface for setting position and size parameters of video media streams from the network servers and for setting position and size parameters of video media streams from analog sources.

10. A method as recited in claim 6, wherein the step of creating a programming object comprises:
    creating a first media-specific programming object representing a digital media source;
    creating a second media-specific programming object representing an analog media source;
    invoking a general-media object creation function with reference to the first media-specific programming object, the general-media object creation function creating a first general-media programming object representing the digital media source and having the common object interfaces;
    invoking the general-media object creation function with reference to the second media-specific programming object, the general-media object creation function creating a second general-media programming object representing the analog media source and having the common object interfaces.

11. In a computer system, a method comprising the following steps:
    obtaining source designations for a plurality of media sources of different types;
    passing each source designation to the same object creation function;
    the object creation function creating programming objects representing the respective media sources based on the source designations, the programming objects having common interfaces regardless of the types of media sources represented by the respective programming objects;
    invoking the interfaces of the programming objects to control media rendering from the media sources represented by the programming objects.

12. A method as recited in claim 11, wherein a source designation indicates a server ID and a filename.

13. A method as recited in claim 11, wherein a source designation indicates a channel number.

14. A method as recited in claim 11, wherein a source designation indicates a frequency.

15. A method as recited in claim 11, wherein source designations are references to object interfaces, the object interfaces having one or more functions that identify the media sources.

16. A method as recited in claim 11, wherein the common interfaces include:
    a play interface for starting and pausing rendering of media streams;
    a volume control interface for setting volume levels of media streams;
    a video control interface for setting position and size parameters of video media streams.

17. A method as recited in claim 11, wherein the common interfaces include:
    a play interface for starting and pausing rendering of media streams from the network servers and for starting and pausing rendering of media streams from analog sources;
    a volume control interface for setting volume levels of media streams from the network servers and for setting volume levels from analog sources;
    a video control interface for setting position and size parameters of video media streams from the network servers and for setting position and size parameters of video media streams from analog sources.

18. A method as recited in claim 11, wherein the object creation function creates programming objects representing both analog and digital media sources, said programming objects having common object interfaces regardless of whether they represent analog or digital media sources.

19. A computer system comprising:
    programming objects representing respective media streams;
    the programming objects having common interface functions that are callable to control playback of different media streams even though such media streams are of different media types.

20. A computer system as recited in claim 19, further comprising a local analog tuner that is one of the media sources.

21. A computer system as recited in claim 19, further comprising a remote network server that is one of the media sources.

22. A computer system as recited in claim 19, further comprising the plurality of media sources, the plurality of media sources including a remote network server and a local analog tuner.

23. A computer system as recited in claim 19, the common interface functions including:
    a play interface for starting and pausing rendering of the media streams;
    a volume control interface for setting volume levels of the media streams.

24. A computer system as recited in claim 19, the common interface functions including:
    a play interface for starting and pausing rendering of the media streams;
    a volume control interface for setting volume levels of the media streams;

a video control interface for setting position and size parameters of the media streams.

25. A network system comprising:

one or more network servers;

a plurality of media streams available from the one or more network servers, the media streams being of different media types;

a network client;

an application program executing at the network client;

programming objects representing the respective media streams, the programming objects having common interface functions that are invoked by the application program to control playback of different media streams even though such media streams are of different media types.

26. A network system as recited in claim 25, the common interface functions including:

a play interface for starting and pausing rendering of the media streams;

a volume control interface for setting volume levels of the media streams.

27. A network system as recited in claim 25, the common interface functions including:

a play interface for starting and pausing rendering of the media streams;

a volume control interface for setting volume levels of the media streams;

a video control interface for setting position and size parameters of the media streams.

28. A network system as recited in claim 25, further comprising a local analog tuner, wherein the common interface functions can be invoked by the application program to control playback of the local analog tuner.

29. A network system as recited in claim 28, the common interface functions including:

a play interface for starting and pausing rendering of the media streams and of the local analog tuner;

a volume control interface for setting volume levels of the media streams and of the local analog tuner.

30. A network system as recited in claim 28, the common interface functions including:

a play interface for starting and pausing rendering of the media streams and of the local analog tuner;

a volume control interface for setting volume levels of the media streams and of the local analog tuner;

a video control interface for setting position and size parameters of the media streams and of the local analog tuner.

31. A computer-readable storage medium containing instructions for creating programming objects representing media sources of different types, the programming objects having common object interfaces regardless of the types of media sources represented by the respective programming objects, said object interfaces being callable to control rendering of media streams supplied by the media sources.

32. A computer-readable storage medium as recited in claim 31, wherein the instructions contained on the computer-readable storage medium are further for creating programming objects representing digital data streams and for creating programming objects representing analog broadcasts.

* * * * *